United States Patent [19]
Slavin et al.

[11] Patent Number: 5,743,655
[45] Date of Patent: Apr. 28, 1998

[54] SELF-ACTING FLUID DYNAMIC BEARING SUPPORT AND METHOD OF ASSEMBLING THEREOF

[75] Inventors: Viktor Slavin; Anna Skobeleva, both of Moscow, Russian Federation; Alexander Shkolnik, San Carlos, Calif.

[73] Assignee: Patent Translation and Consulting Co., Inc., Foster City, Calif.

[21] Appl. No.: 815,797

[22] Filed: Mar. 12, 1997

[51] Int. Cl.⁶ .................... F16C 32/06; F16C 43/02
[52] U.S. Cl. .................... 384/107; 384/905; 29/898.02
[58] Field of Search .................... 384/100, 107, 384/112, 278, 905; 29/898.02

[56] References Cited

U.S. PATENT DOCUMENTS

| | | | |
|---|---|---|---|
| 4,140,592 | 2/1979 | Orlando | 204/56 R |
| 5,018,881 | 5/1991 | Asada | 384/113 |
| 5,127,744 | 7/1992 | White et al. | 384/107 X |
| 5,357,162 | 10/1994 | Aiyoshizawa et al. | 384/112 X |
| 5,358,339 | 10/1994 | Konno et al. | 384/107 |
| 5,538,347 | 7/1996 | Itoh et al. | 384/107 |

*Primary Examiner*—Thomas R. Hannon

[57] ABSTRACT

A self-acting gas- dynamic or hydrodynamic bearing support for units rotating with a speed of about 10,000 rpm or higher consists of a stationary shaft (16) and a rotating bearing member (20) put on shaft with a radial gap of about 1 to 2 μm. A distinguishing feature of the bearing support of the invention consists in that bearing member (20) is made of a wear-resistant ceramic and the thrust members (12 and 14) and the shaft (16) are made of steel with wear-resistant coating. The difference in coefficients of linear thermal expansion of steel and ceramic is advantageously used in assembling for self-positioning of the thrust members strictly perpendicular to the shaft and strictly parallel to each other and to the end surfaces of the bearing member. The invention also concerns a method of assembling of the bearing support.

29 Claims, 3 Drawing Sheets

SELF-ACTING FLUID DYNAMIC BEARING SUPPORT AND METHOD OF ASSEMBLING THEREOF

FIELD OF THE INVENTION

The present invention relates to high-speed self-acting bearing supports and, more particular, to self-acting fluid dynamic bearing supports which rotate with high speed without physical contact between rotating and stationary parts. The invention also relates to a method of assembling of the aforementioned bearing supports.

BACKGROUND OF THE INVENTION

Nowadays computers, computer printers, camcorders and similar items may be found almost in any office and household. What is common for these items is that they utilize high-speed bearing supports for supporting rotating parts such as rotors of hard disk drives in computers, rotating polygonal mirrors in camcorders, and the like. At the present time speed of rotations in these devices exceeds 10000 rpm, and it is expected that these speeds will continue to grow along with an ever growing demand for longer service life. However, as is known, an increase in speed of rotation is in contradiction with the service life. Therefore the industry is facing a serious problem—to increase the rotation speed along with an increase in the service life of high-speed units. Another demand to the high-speed bearings is to reduce overall dimensions of the rotating units and at the same time to improve stability and reliability of their operation.

Conventional high-speed rotors, spindles, and drums used in aforementioned devices are supported by ball bearings. The use of ball bearings is based on the fact that the construction and processes of manufacturing of ball bearings are well developed and tested in practice. However, the ball bearings have limits of their rotation speeds. This is because with the speeds exceeding 10000 rpm they begin to generate vibrations caused by manufacturing inaccuracies, deviations from ideal geometry and shape, etc. This, in turn, leads to an increase in radial and axial runouts, instability of rotation, and decrease in the service life of the bearings.

What is most important is that the limit in the speeds of rotation becomes a bottleneck in the implementation of newly-developed and revolutionary new high-tech devices such as hard disk drives with an increased density of information recorded on hard disks of smaller diameters. It is anticipated that this problem will continue to grow.

Attempts have been made to solve the above problems by utilizing so called gas-dynamic and hydrodynamic bearings which are plain bearings operating on gas or liquid lubricant, i.e., without physical contact between rotating and stationary parts during operation of the bearing. The construction of these bearings is well known and is disclosed, e.g., in U.S. Pat. No. 5,358,339 issued to D. Konno in October 1994.

However, such bearings require that gas or liquid be supplied under pressure to the gap between the rotating and stationary parts in order to maintain the mating parts on pressurized-fluid lubricating film without physical contact. This requires the use of a source of supply for the gas or liquid under pressure which is impossible, e.g., in the case of a personal computer used in a household or office where there is no sources of fluid under pressure. In addition, the constructions of bearings with positive supply of fluid under pressure are complicated and expensive to manufacture.

In view of the above, self-acting bearings of the type described in U.S. Pat. No. 5,018,881 to T. Asada in May 1991, have been developed. During rotation such bearings generate pressure by means of specially-profiled grooves and working surfaces and which suck the fluid from the surrounding area into the bearing gap have been developed. The fluid may be air, or any other gas, as well as a liquid taken from a storage reservoir placed, e.g., inside the bearing assembly itself. The gas bearing of this type can be started or stopped in a dry-friction mode, i.e., without initial formation of pressurized gas film.

The problem associated in connection with the use of last-mentioned self-acting gas bearings in high-speed unit is that, because of dry-friction mode of starting and stopping, such bearings should have to be made of materials with an extremely high resistance to wear in combination with a low coefficient of friction. In order to satisfy these conditions, the working surfaces of the bearings are coated with wear-resistant coatings that possess the required properties. Such coatings are made of titanium nitride, diamond-like materials, etc., in the form of films having a thickness up to several dozen microns (see U.S. Pat. No. 4,140,592 to V. Orlando in February 1979.

However, although such coating can be easily applied, e.g., by chemical or physical deposition in vacuum, by plasma or sputtering onto external surfaces, it is difficult to ensure uniform application and control of the coating onto inner surfaces, such as holes or openings, especially in constructions with a high length-to-diameter ratio. The later case, however, is the most common for gas bearings of miniature high-speed units such as hard disk drives or rotating drums of camcorders.

The above problem is associated with manufacturing and assembling of the gas bearing supports. Another problem, however, is connected with reliable operation of such bearing supports as they require that the pressurized-fluid gap be maintained constant and have a predetermined thickness over the entire length of the bearing. Normally the air gap in a gas bearing has to be on the order of 1 to 2 µm, i.e., the manufacturing tolerances have to be in a very narrow limits. These strict requirements relate not only to cylindrical working surfaces of the gas bearing supports, but also to end-face flat surfaces of the supports which also are working surfaces of gas bearing supports which have a pressurized-fluid film between the end surfaces of the rotating parts of the bearing and stationary parts of the support. The opposite end-face surfaces have to be strictly parallel to each other and to mating surfaces of supports and strictly perpendicular to the aforementioned cylindrical surfaces. Such parallelity and perpendicularity must be within the fractions of micron over the length of the working surface. In order to satisfy these requirements, the parts of the gas bearing supports must be manufactured to strict tolerances with the use of expensive and precision tooling and instruments which are used for alignment of the mating surfaces during assembling. The use of these devices make the gas bearing supports expensive to manufacture.

OBJECTS OF THE INVENTION

It is an object of the invention to provide a self-acting high-speed fluid dynamic bearing support which is simple in construction, inexpensive to manufacture, is made of wear-resistant materials with a low coefficient of friction and has a working surface in an opening which does not require application of a layer of a hard wear-resistant material. Another object of the invention is to provide aforementioned bearing supports with a high length-to-diameter ratio. Still another object is to provide the bearing of the aforementioned type which can be assembled quickly without the implementation of complicated aligning operations and where the construction of the bearing support ensures self-alignment of working surfaces of the support and maintenance of uniformity and dimensional accuracy of the pressurized-fluid gap over the length and on end faces of the bearing support. Another object is to provide a method for manufacturing the self-acting high-speed fluid dynamic bearing support of the aforementioned type.

These and other objects and features of the invention will become apparent after consideration of the ensuing description and the accompanying drawings.

SUMMARY

Figure 1:
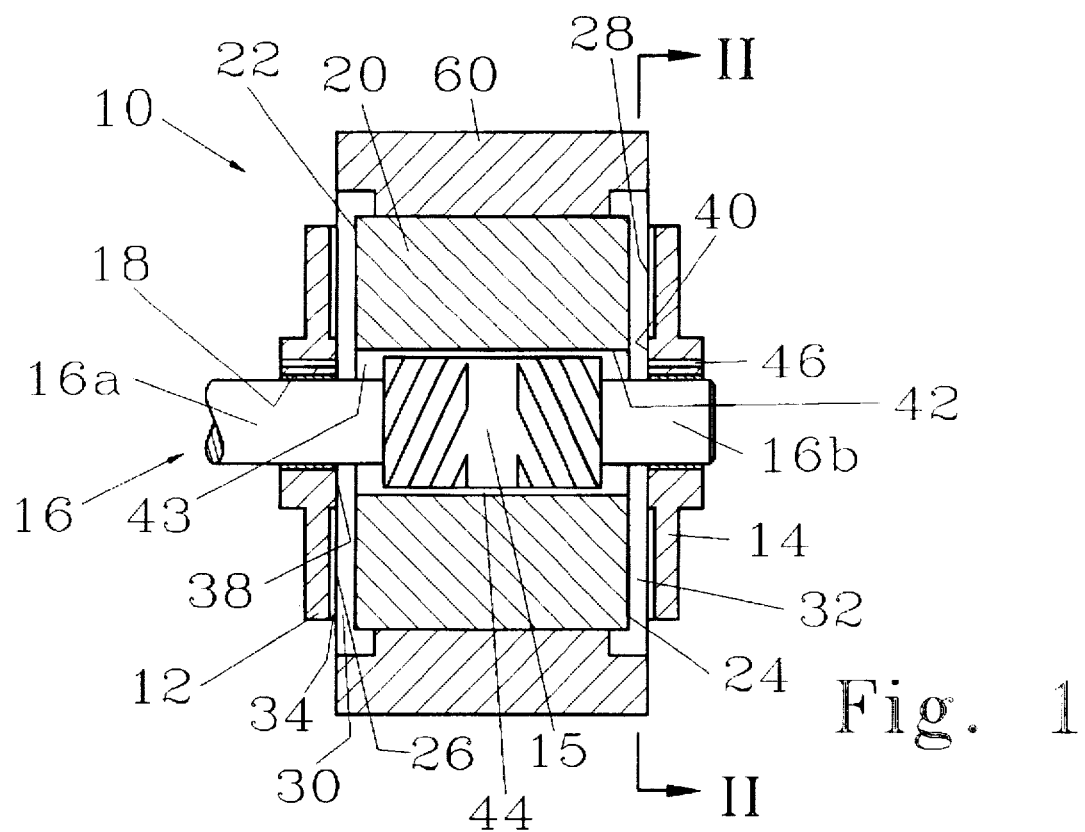
FIG. 1 is a longitudinal sectional view of a self-acting fluid dynamic bearing support made in accordance with the present invention.

The invention relates to a high-speed self-acting fluid bearing support for use, e.g., in a hard disk driver of a data recording unit. The bearing support consists of a pair of disk-like thrust members which are rigidly attached to a stationary shaft, e.g., by means of a polymerizable glue by heating in an oven or by means of welding. A rotating bearing member of the bearing support is placed between the thrust members. The end-face surfaces of the bearing member and facing surfaces of the thrust members have microscopic gaps. The thrust members have shallow spiral grooves with a depth of 2 to 4 μm. The grooves are open to the periphery of the thrust members for taking-in air from the surrounding atmosphere. The grooves terminate at some distance from the inner periphery of the thrust members to form a sealing zone in order to direct air under an increased pressure to the aforementioned gaps. As a result, during rotation of the bearing member a pressurized fluid functions as a lubricant that prevents physical contact between facing end surfaces of the thrust members and the bearing member. In the radial part of the bearing, a lubricating film is formed due to eccentricity of the stationary shaft with respect to the bearing opening. During rotation, stability of the rotating bearing member is enhanced by forming auxiliary shallow helical grooves in the surface of the stationary shaft. A distinguishing feature of the bearing support of the invention consists in that the bearing member is made of a wear-resistant ceramic and the thrust members are made of steel with wear-resistant coating on the working end surfaces. Coefficients of linear thermal expansion of the ceramic bearing member and steel-made thrust members and the shaft are selected so that after the fixation of the thrust members to the stationary shaft, e.g., by welding and after cooling of the connected parts to working temperature, axial gaps having a thickness required for normal operation of the bearing are formed. The fact that the bearing member and the thrust members and shaft are made of materials with different coefficients of linear thermal expansion is used for providing strict perpendicularity of the working surfaces of the thrust members to the surface of the working portion of the stationary shaft. This is achieved by heating the unit to the temperature at which the bearing member is temporarily press fitted onto the shaft for adjusting uniformity of the gaps using the end surfaces of the fixed bearing member as a reference. As a result, the shaft and the bearing member form an integral unit. In addition, the use of the bearing member surface requires that the thrust member have a loose fit on the protruding end of the shaft. This is necessary to allow reliable contact of the end face of the thrust member over the entire working end surface of the bearing member. This means that there is no need in accurate machining of the protruding end of the shaft and the opening of the thrust member.

DETAILED DESCRIPTION OF THE PREFERRED EMBODIMENT OF THE INVENTION

Figure 2:
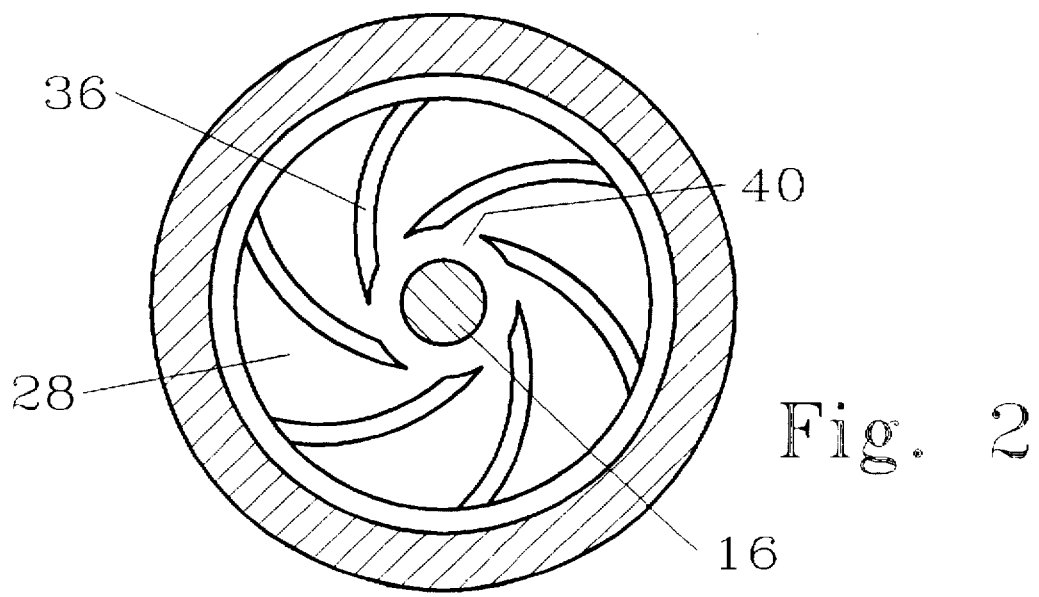
FIG. 2 is a sectional view along line II—II of FIG. 1.

The invention will be further described in the form of its preferred embodiment with reference to the accompanying drawings, wherein FIG. 1 is a longitudinal sectional view of a high-speed gas bearing support made in accordance with the present invention, and FIG. 2 is a sectional view along line II—II of FIG. 1.

For convenience of description, the following text will relate to a gas bearing. It should be understood, however, that the structural features and technological steps of the method are equally applicable both to self-acting gas dynamic and hydrodynamic bearings.

The bearing support which in general is designated by reference numeral 10 consists of a pair of disk-like thrust members 12 and 14 which are rigidly attached to ends 16a and 16b protruding outside. In the illustrated case, the cylindrical inner member is made in the form of a stationary shaft 16. Thrust members 12 and 14 may be attached by means of a polymerizable glue 18.

Shaft 16 which has a central outer working portion 15 of a predetermined diameter is inserted into a central axial opening 43 of a cylindrical outer member 20 of a predetermined width so that outer working portion 15 is placed inside aforementioned opening, and protruding ends 16a and 16b protrude outside. Hereinafter the outer member will be referred to as a rotating bearing member 20. Disk-like thrust members 12 and 14 which may be made, e.g., of steel are attached to protruding ends 16a and 16b of stationary shaft 16, e.g., by means of polymerizable glue such as an epoxy resin which may be polymerized at a temperature of about 120° C.

Working end surfaces 22, 24 of bearing member 20 and facing thrust surfaces 26, 28 of thrust members 12 and 14 have microscopic gaps 30 and 32, respectively. Thrust members 12 and 14 have shallow nonthrough profiled grooves, i.e., spiral grooves 34 and 36 with a depth of 2 to 3 μm. Although only one groove is designated as 34 and 36 on each respective surface 26 and 28, it can be seen from FIG. 2 that a plurality of such grooves is formed in each respective surface. Each groove is open to the periphery of the respective thrust member for taking-in air from the surrounding atmosphere. As can be seen from FIG. 2, grooves 34 and 36 are not through and terminate at some distance from the inner periphery of thrust members 12 and 14 to form sealing zones 38 and 40 in order to direct air under an increased pressure to aforementioned gaps 30 and 32. As a result, during rotation of bearing member 20 a pressurized gas functions as a lubricant that prevents physical contact between facing end surfaces 26, 28 of thrust members 12, 14 and bearing member 20.

In order to create a radial gap 44 for a gaseous lubricating film between stationary shaft 16 and an inner surface 42 of central opening 43 of bearing member 20, air is sucked to radial gap 44 between stationary shaft 16 and bearing member 20, e.g., via an axial channel 46 drilled in thrust member 14. During rotation, stability of rotating bearing member 20 is enhanced by forming auxiliary shallow helical grooves 48 and 50 in the surface of the stationary shaft. Although only two such grooves 48 and 50 (FIG. 4) are designated in the drawing, it is understood that a plurality of such grooves are formed on each side of the working portion of stationary shaft 16.

A distinguishing feature of the bearing support of the invention consists in that bearing member 20 is made of a wear-resistant ceramic such as $Al_2O_3$ and thrust members 12 and 14 are made of steel such as stainless nickel-chromium steel with wear-resistant coating, such as TiN, on working surfaces 26 and 28.

The fact that bearing member 20 and shaft 16 with thrust members 12 and 14 are made of materials with different coefficients of linear thermal expansion is used for providing strict perpendicularity of working end surfaces 26 and 28 of the thrust members to the working outer surface of stationary shaft 16. As will be described in detail later with reference to the method of manufacturing and assembling of gas bearing support unit 10, the above feature is achieved by heating the unit to the temperature at which bearing member 20 is temporarily press fitted onto the shaft, due to greater expansion of the latter, for adjusting uniformity of gaps 30, 32, using the end surfaces of now fixed bearing member 20 as a reference.

It is understood that rotating ceramic bearing member 20 may rigidly support a rotor 60 of the motor (not shown) which may support a part (not shown) which has to be rotated with a high speed on the order of 10000 rpm or higher and with high stability of rotation over a long period of time. It may be, e.g., a hard disk of a data recording apparatus, a polygonal mirror of a laser printer, a rotating drum of a camcorder, or the like.

It is also understood that the conditions described above can be fulfilled only if appropriate mating working surfaces, i.e., the surface of opening 43 in the bearing member 20 and the outer working surface of shaft 16, as well as working surfaces 26, 28 of thrust members and facing surfaces 22, 24 of bearing member 20 are machined to condition of high surface accuracy. Working end surfaces of 22 and 24 of bearing member 20 must be strictly parallel to each other and perpendicular to the surface of opening 43. Deviations from the aforementioned parallelity and perpendicularity, as well as the height of surface roughness should be on an order or at least several times lower than the aforementioned radial and axial gaps of the bearing support.

Radial gaps 61 and 63 may be left between the peripheries of stationary thrust members 12, 14 and mating inner surfaces 65, 67 of rotor 60. These gaps 61 and 63 are required for admission of air sucked from the surrounding atmosphere to working gaps 30 and 32 during rotation of the rotor.

Self-acting gas bearing support 10 of the present invention operates as follows:

When the motor (not shown) is started, motor rotor 60 begins to rotate together with ceramic bearing member 20.

In accordance with the known laws of aerodynamic, immediately with initiation of rotation, grooves 34 and 36 on end surfaces of stationary thrust members 12 and 14 take air from the surrounding atmosphere and guide this air further in the direction of shallow grooves 34 and 36. This creates air wedges between rotating surfaces 22, 24 and stationary surfaces 26, 28. As the rotation is continued, pressurized-air films are formed between surfaces 22, 24 and 26, 28. As a result, stable air gaps 30 and 32 having a thickness of about 1 to 2 μm, which are determined by specificity of the construction and assembling of self-acting bearing support 10, are formed. Due to the presence of air gaps 30 and 32 which are filled with a lubricating film made of pressurized air, physical contact between rotating bearing member 20 and stationary thrust members 12 and 14 is prevented. Since air in gaps 30 and 32 is under pressure, the lubricating air films formed between the rotating and stationary parts of the self-acting bearing support 10 possess a required stiffness. This pressure of air in gaps 30 and 32 is maintained due to the presence of sealing areas 38 and 40 which restricts the flow of air outward from gaps 30 and 32.

Now the operation of the radial portion of bearing support 10 will be described. In a static state, ceramic bearing member 20, which prior to start of the motor is in a stationary state, rests on stationary shaft 16 with some eccentricity in central opening 43 of ceramic bearing member 20.

As rotor 60 and bearing member 20 begin to rotate, air which is contained in the space between stationary shaft 16 and the surface of opening 43 of rotating bearing member 20 is sucked toward the narrowing gap thus forming an air wedge and hence an air film in radial gap 44. Stability of radial air gap 44 is enhanced by the provision of helical grooves 48 and 50 which may suck additional air to radial gap 44 via channel 46. Grooves 48 and 50 guide portions of air toward each other, i.e., to the central part of stationary shaft thus creating an additional overpressure that stabilizes the air film in radial gap 44.

Now a method of assembling and adjusting of self-acting gas bearing support 10 will be described.

Figure 1A:
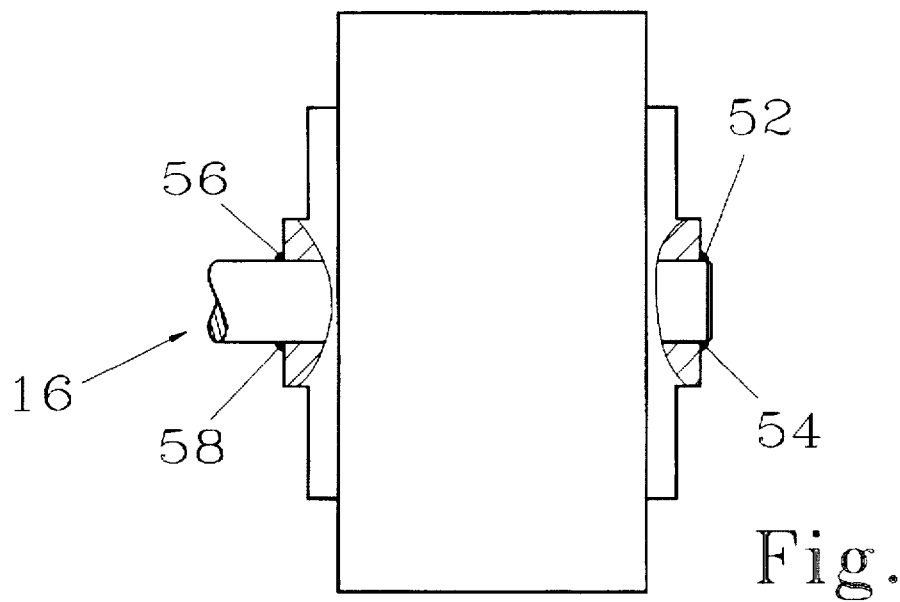
FIG. 1A is identical to FIG. 1 with the exception that thrust members are connected to a stationary shaft by welding rather than by means of a polymerizable glue.

After manufacturing of stationary shaft 16 and thrust members 12, 14 with dimensions and surface conditions to required tolerances (the diameter of opening 43 should exceed the diameter of shaft by 2 to 4 μm), shaft 16 is inserted into opening 43 of ceramic bearing member 20 so that central working portion 15 of shaft 16 is located symmetrically inside opening 43. In this mutual position, bearing member 20 with stationary shaft 16 are then heated. As coefficient $\alpha_1$ of linear thermal expansion of ceramic bearing member 20 is lower than coefficient $\alpha_2$ of linear thermal expansion of steel shaft 16, radial gap 44 which is on the order of 1 to 2 μm is reduced to 0, or a slight press fit of about 1 μm (on a side) is formed. As a result, in a heated state, bearing member 20 and shaft 16 are temporarily rigidly connected into an integral unit. While the unit is still in a this state, one thrust member, e.g., thrust member 12 is put on one protruding end 16a of shaft 16 till contact with corresponding mating surface 22 of bearing member 20 which in this case is used as a reference surface for accurate positioning of thrust member 12. As a result, the end face 26 of thrust member 20 is arranged strictly perpendicular to longitudinal axis of shaft 16 and strictly in parallel with mating surface 22 of bearing member 20. In this position, thrust member 12 is fixed to shaft 16 by polymerizing polymeric glue 18 (FIG. 1) or by welding at points 56 and 58 (FIG. 1A).

A temperature $T_1$ to which the unit should be heated to eliminate radial gap 44 is calculated by the following formula:

$$T_1 = T_o + \frac{\Delta h}{(\alpha_2 - \alpha_1)D},$$

where $T_1$ is the heating temperature, $T_O$ is room temperature, $\Delta h$ is a doubled radial gap 44, D is a nominal diameter of opening 43, and $\alpha_1$, $\alpha_2$ are the same as defined above. For example, with double radial gap 44 equal to 3 µm, diameter D equal to 5 mm, $\alpha_1$ is equal to $7.5 \times 10^{-6}$ 1/°C., and $\alpha_2$ equal to $12.5 \times 10^{-6}$ 1/°C., $T_1$ is equal to 140° C.

The next step in the assembling procedure is fixation of second thrust member 14 and adjustment of an axial play which in the assembled bearing support of FIG. 1 is equal to the sum of gaps 30 and 32.

Figure 4:
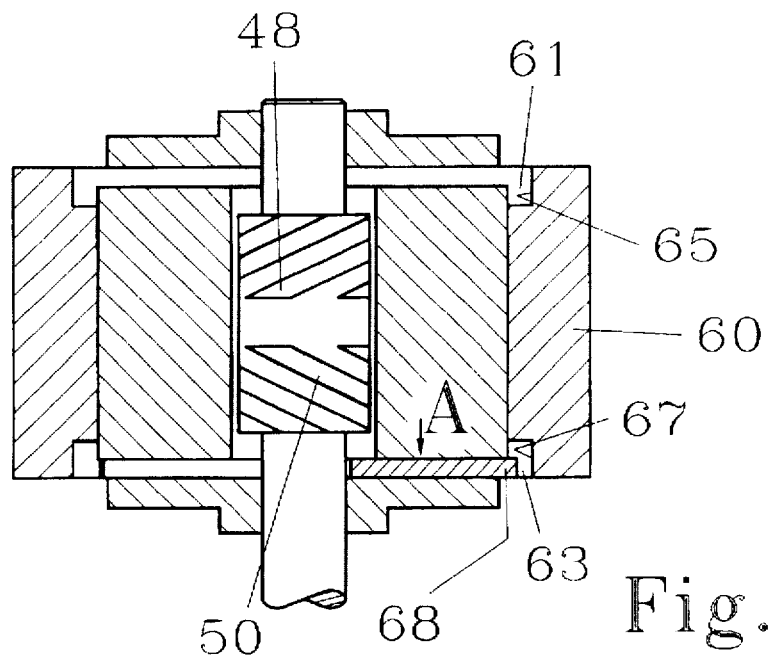
FIG. 4 is side view of a stationary unit of FIG. 3 in a step of adjusting of an axial gap.
Figure 5:
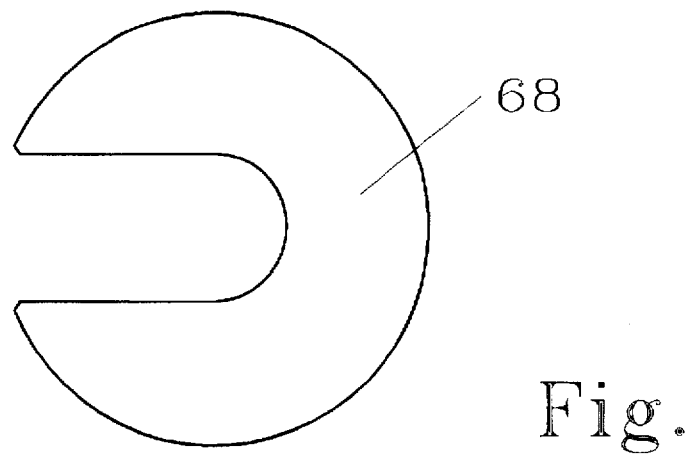
FIG. 5 is a view of one of technological shims in the direction of arrow A of FIG. 4.
Figure 3:
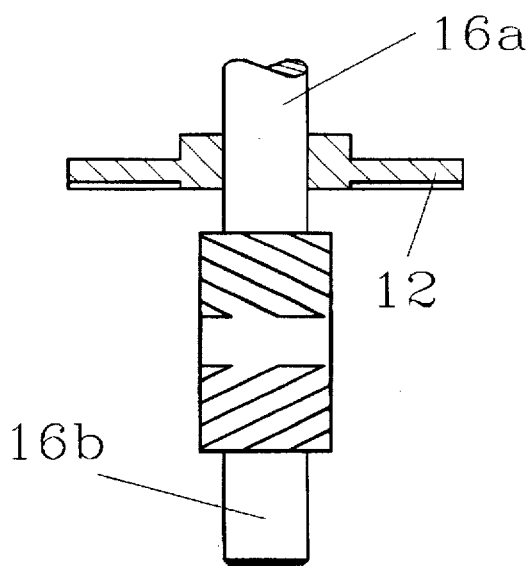
FIG. 3 is side view of a partially assembled stationary unit of the bearing support of the invention with one of the thrust members being installed.

As a result of the previously described operations, a unit of the type shown in FIG. 3 is obtained. FIG. 3 is side view of a partially assembled stationary unit of the bearing support of the invention with thrust member 12 being installed. Now, as shown in FIG. 4, bearing member 20 is put on shaft 16 until it comes into contact with surface 26 of thrust member 12, and then second thrust member 14 is placed on end 16b of shaft 16 opposite to the location of thrust member 12 via a shim of a predetermined thickness which consists of at least one shim element 68 of the type shown in FIG. 5. FIG. 5 is a view of one of technological shims in the direction of arrow A of FIG. 4. The thickness of shim 68 is approximately equal to the aforementioned axial play, i.e., the sum of gaps 30 and 32. After fixation of the second thrust member 14 on shaft 16 by polymerizable glue 18 which is polymerized at room temperature, the unit is slightly heated by 10° to 20° C. above the room temperature, whereby the axial length of shaft 16 is increased, and the shim/shims is/are removed. If polymerization is conducted at temperatures higher than room temperature, the thickness of shim 68 is selected so that after cooling of the unit a required radial gap is obtained. In order to remove shim 68 from the unit, the latter should be heated 10° to 20° C. above the temperature of polymerization. In case of heating, the thickness S of shim 68 at the polymerization temperature which is above room temperature is calculated by means of the following formula:

$$S = S_0 + (\alpha_2 - \alpha_1)\Delta T \cdot L$$

where $S_0$ is a thickness of shim 68 at room temperature and L is a distance between surfaces 26 and 28. For example, for $\Delta T$ equal to 10 mm, S should exceed $S_0$ by 2.5 µm.

Thrust member 14 can be installed on shaft 16 in a position required for accurate dimension of axial play without the use of any technological intermediate shims. For this purpose, thrust member 14 is put on the protruding end 16b of shaft 16 opposite to thrust member 12 and is pressed against surface 24 of bearing member 20. In this state, the unit is cooled to a temperature $T_c$ below room temperature $T_O$, and thrust member 14 is then welded to shaft 16, e.g., at points 52 and 54. When after welding the unit is heated to room temperature $T_O$, a required axial play is obtained between thrust members 12, 14 and bearing member 20, due to the difference in the thermal deformations $\alpha_1$ of the materials of ceramic bearing member 20 and steel thrust members 12 and 14.

In this case, temperature $T_c$ is calculated by the following formula:

$$T_c = T_o - \frac{\Delta A}{(\alpha_2 - \alpha_1)L},$$

where $\Delta A$ is an axial play, and the remaining symbols are the same as defined earlier.

Thus it has been shown that the invention provides a self-acting high-speed gas dynamic bearing support which is simple in construction, inexpensive to manufacture, is made of wear-resistant materials with a low coefficient of friction and has a working surface in an opening which does not require application of a layer of a hard wear-resistant material. The bearing support may be accomplished with a high length-to-diameter ratio as it does not require application of a wear-resistant coating on the surface of the opening in the bearing member. The bearing can be assembled quickly and without the implementation of complicated aligning operations. The construction of the bearing support ensures self-alignment of working surfaces of the support and maintenance of uniformity and dimensional accuracy of the pressurized-fluid gap over the length and on end faces of the bearing support. The invention also provides a method for manufacturing a self-acting high-speed gas dynamic bearing support of the aforementioned type.

Although the invention has been described with reference to specific constructions and technological steps, it is understood that these constructions and technological steps were given only as examples which do not limit the scope of application of the present invention. For example, the bearing member may be made of wear-resistant material other than ceramic, provided this material has a coefficient of linear thermal expansion smaller than that of the shaft and the thrust members. Shaft 16 may be a part rotating within stationary sleeve 20. Grooves may provide converging or diverging flows. Therefore any modifications are possible within the limits of the attached claims.

We claim:

1. A self-acting fluid dynamic bearing support having a radial gap and an axial play, comprising:

an inner cylindrical member having an outer working portion of a predetermined diameter and protruding ends on both sides of said outer working portion;

an outer cylindrical member having a width, a first working end surface on one side, a second end working surface strictly parallel to said first working end surface on the other side of said outer cylindrical member, and an opening with a diameter exceeding said predetermined diameter by an amount equal to a doubled magnitude of said radial gap of said bearing support;

a first thrust member attached to one of said protruding ends and having a working surface on a side facing said first working end surface;

a second thrust member attached to another one of said protruding ends at a distance exceeding said width of said bearing support, said second thrust member having a working surface on a side facing said second working end surface;

said outer cylindrical member being made of a first material, said inner cylindrical member being made of a second material, said first material having a coefficient of linear thermal expansion lower than a coefficient of linear thermal expansion of said inner cylindrical member, at least said working surface of said first thrust member and said working surface of said second thrust member having nonthrough profiled grooves which extend from outer peripheries of said first thrust member and said second thrust member but do not reach said shaft, said coefficients of linear thermal expansion and said radial gap satisfying the following relationship:

$$T_1 = T_o + \frac{\Delta h}{(\alpha_2 - \alpha_1)D},$$

where $T_1$ is the heating temperature, $T_0$ is room temperature, $\Delta h$ is a doubled value of said radial gap, D is said diameter of said opening, and $\alpha_1$ is a coefficient of linear thermal expansion of said first material, and $\alpha_2$ is a coefficient of linear thermal expansion of said second material.

2. The self-acting fluid dynamic bearing support of claim 1, wherein said first material is a ceramic and said second material is steel with wear-resistant coatings at least on the surface of said outer working portion and on the working surfaces of said thrust members.

3. The self-acting fluid dynamic bearing support of claim 2, where said inner cylindrical member is stationary and said outer cylindrical member is rotatable.

4. The self-acting fluid dynamic bearing support of claim 3, wherein the surface of said opening and said outer working surface have the height of surface roughness being at least several times smaller than said radial gap, and wherein said working end surfaces are strictly parallel to each other and perpendicular to the surface of said opening, said parallelilty and perpendicularity being at least several times lower than said radial gap and said axial play.

5. The self-acting fluid dynamic bearing support of claim 4 where said radial gap is within the range of 1 to 2 microns and said axial play is within the range of 2 to 4 microns.

6. The self-acting fluid dynamic bearing of claim 4 where said fluid is gas.

7. The self-acting fluid dynamic bearing of claim 6, wherein said inner cylindrical member being further provided with auxiliary profiled grooves which communicate with the surrounding atmosphere for sucking said gas into said radial gap to stabilize said radial gap during rotation of said rotatable outer cylindrical member.

8. A self-acting gas bearing support having a radial gap and an axial play, comprising:

a stationary shaft made of steel and having an outer working portion of a predetermined diameter and protruding ends on both sides of said outer working portion;

a rotatable cylindrical bearing member made of a ceramic having a width, a first working end surface on one side, a second end working surface strictly parallel to said first working end surface on the other side of said bearing member, and an opening with a diameter exceeding said predetermined diameter by an amount equal to a doubled magnitude of said radial gap of said bearing support;

a first thrust member attached to one of said protruding ends and having a working surface on a side facing said first working end surface;

a second thrust member attached to another one of said protruding ends at a distance exceeding said width of said bearing support, said second thrust member having a working surface on a side facing said second working end surface;

at least said working surface of said first thrust member and said working surface of said second thrust member having nonthrough profiled grooves which extend from outer peripheries of said first thrust member and said second thrust member but do not reach said shaft, said bearing member having a first coefficients of linear thermal expansion and said shaft having a second coefficient of linear thermal expansion, said radial gap and said first and second coefficient of linear thermal expansion having a relationship that satisfies the following condition:

$$T_1 = T_o + \frac{\Delta h}{(\alpha_2 - \alpha_1)D},$$

where $T_1$ is the heating temperature, $T_0$ is room temperature, $\Delta h$ is a doubled value of said radial gap, D is said diameter of said opening, and $\alpha_1$ is said first coefficient of linear thermal expansion and $\alpha_2$ is said second coefficient of linear thermal expansion.

9. The self-acting gas bearing of claim 8, wherein the surface of said opening and said outer working surface have the height of surface roughness being at least several times smaller than said radial gap, and wherein said working end surfaces are strictly parallel to each other and perpendicular to the surface of said opening, said parallelilty and perpendicularity being at least several times lower than said radial gap and said axial play.

10. The self-acting fluid dynamic bearing support of claim 9 where said radial gap is within the range of 1 to 2 microns and said axial play is within the range of 2 to 4 microns.

11. The self-acting fluid dynamic bearing of claim 9, wherein said stationary shaft being further provided with auxiliary profiled grooves which communicate with the surrounding atmosphere for sucking gas into said radial gap to stabilize the position of said radial gap during rotation of said rotatable outer cylindrical member.

12. A method for assembling a self-acting fluid dynamic bearing support having a radial gap and an axial play, comprising the steps of:

providing a shaft having a central working portion of a predetermined diameter and a first protruding end on one side and a second protruding end on the other side;

providing a cylindrical bearing member with a first working end surface, a second working end surface, and an opening of a diameter that exceeds said predetermined diameter by a magnitude of a doubled value of said radial gap, said bearing member being made of a material with a first coefficient of linear thermal expansion and said shaft being made of a material with a second coefficient of linear thermal expansion, said second coefficient of linear thermal expansion being greater than said first 1 coefficient of linear thermal expansion;

fitting said bearing member on said working portion;

heating said shaft together with said bearing member to a temperature $T_1$ at which said shaft and said bearing member are temporarily rigidly connected into an integral unit due to a press fit caused by a greater thermal expansion of said shaft;

providing a first thrust member having an opening and a first thrust surface with nonthrough profiled grooves on said first thrust surface, said grooves extending from the periphery of said first thrust member but not reaching said opening of said thrust member;

fitting said first thrust member to said first protruding end so that said first thrust surface faces said bearing member and pressing said thrust surface of said first thrust member to said first thrust end surface of said bearing member while said bearing member and said shaft are still in a rigidly connected state so that said working end surface of said bearing member is used as a reference for positioning said first thrust member strictly perpendicular to said shaft;

fixing said first thrust member to said first protruding end, while said bearing member and said shaft are still in said rigidly connected state;

cooling said integral unit to a room temperature;

providing a second thrust member having an opening and a thrust surface with nonthrough profiled grooved on its working thrust surface, said grooves extending from the periphery of said first thrust member but not reaching said opening of said thrust member;

fitting said second thrust member to said second protruding end, placing a technological shim having a width of said axial play between said working thrust surface of said bearing member and said thrust surface of said second thrust member and pressing said second thrust member to said second working end surface of said bearing member via said technological shim;

fixing said second thrust member to said second protruding end while said second thrust member is still in said pressed state, thus forming a self-acting fluid dynamic bearing support unit;

heating said self-acting fluid dynamic bearing support unit for removing said shim.

13. The method of claim 12, wherein said first coefficient of linear thermal expansion, said second coefficient of linear thermal expansion, and said radial gap satisfying the following relationship:

$$T_1 = T_o + \frac{\Delta h}{(\alpha_2 - \alpha_1)D},$$

where $T_1$ is said heating temperature, $T_0$ is room temperature, $\Delta h$ is a doubled value of said radial gap, D is said diameter of said opening, and $\alpha_1$ is said first coefficient of linear thermal expansion, and $\alpha_2$ is said second coefficient of linear thermal expansion.

14. The method of claim 13, wherein said first material is a ceramic and said second material is steel with wear-resistant coatings at least on the surface of said central working portion and on said first thrust surface and said second thrust surface.

15. The method of claim 14, where said shaft is stationary and said bearing member is rotatable.

16. The method of claim 15, wherein the surface of said opening of said bearing member and said central working surface have the height of surface roughness being at least several times smaller than said radial gap, and wherein said end working surfaces are strictly parallel to each other and perpendicular to the surface of said opening, said parallelilty and perpendicularity being at least several times lower than said radial gap and said axial play.

17. The method of claim 13, wherein said radial gap is within the range of 1 to 2 microns and said axial play is within the range of 2 to 4 microns.

18. The method of claim 13, wherein said fluid is gas.

19. The method of claim 18, wherein said shaft being further provided with auxiliary profiled grooves which communicate with the surrounding atmosphere for sucking said gas into said radial gap to stabilize said radial gap during rotation of said bearing member.

20. A method for assembling a self-acting fluid dynamic bearing support having a radial gap and an axial play, comprising the steps of:

providing a shaft having a central working portion of a predetermined diameter and a first protruding end on one side and a second protruding end on the other side;

providing a cylindrical bearing member having a width and a first working end surface, a second working surface end surface, and an opening of a diameter that exceeds said predetermined diameter by a magnitude of a doubled value of said radial gap, said bearing member being made of a material with a first coefficient of linear thermal expansion $\alpha_1$ and said shaft being made of a material with a second coefficient of linear thermal expansion $\alpha_2$, said second coefficient of linear thermal expansion $\alpha_2$ being greater than said first coefficient of linear thermal expansion $\alpha_1$;

fitting said bearing member on said working portion;

heating said shaft together with said bearing member to a temperature $T_1$ at which said shaft and said bearing member are temporarily rigidly connected into an integral unit due to a press fit;

providing a first thrust member having an opening and a first thrust surface with nonthrough profiled grooves on said first thrust surface, said grooves extending from the periphery of said first thrust member but not reaching said opening of said thrust member;

fitting said first thrust member to said first protruding end so that said working thrust surface faces said bearing member and pressing said thrust surface of said first thrust member to said first working end surface of said bearing member while said bearing member and said shaft are still in a rigidly connected state so that said working end surface of said bearing member is used as a reference for positioning said first thrust member strictly perpendicular to said shaft;

fixing said first thrust member to said first protruding end by fixing means;

cooling said shaft, said bearing member, and said first thrust member to room temperature;

providing a second thrust member having an opening and a thrust surface with nonthrough profiled grooved on its working thrust surface, said grooves extending from the periphery of said first thrust member but not reaching said opening of said thrust member;

fitting said second thrust member to said second protruding end;

pressing said second thrust member to said second working end surface of said bearing member thus forming said self-acting fluid dynamic bearing unit;

cooling said self-acting fluid dynamic bearing unit to a temperature $T_c$; and fixing said second thrust member to said second protruding end of said shaft by welding while said self-acting fluid dynamic bearing unit is still under said temperature $T_c$;

said temperature $T_c$ being calculated with the use of the following formula:

$$T_c = T_o - \frac{\Delta A}{(\alpha_2 - \alpha_1)L},$$

where $\Delta A$ is said axial play, L is said width of said bearing member, $T_0$ is room temperature, $\alpha_1$ is said first coefficient of linear thermal expansion, and $\alpha_2$ is said second coefficient of linear thermal expansion.

21. The method of claim 20, wherein said first coefficient of linear thermal expansion, said second coefficient of linear thermal expansion, and said radial gap satisfying the following relationship:

$$T_1 = T_o + \frac{\Delta h}{(\alpha_2 - \alpha_1)D},$$

where $T_1$ is said heating temperature, $T_o$ is room temperature, $\Delta h$ is a doubled value of said radial gap, D is said diameter of said opening of said bearing member, $\alpha_1$ is said first coefficient of linear thermal expansion, and $\alpha_2$ is said second coefficient of linear thermal expansion.

22. The method of claim 21, wherein said first material is a ceramic and said second material is steel with wear-resistant coatings at least on the surface of said central working portion and on said first thrust surface and said second thrust surface.

23. The method of claim 22, where said shaft is stationary and said bearing member is rotatable.

24. The method of claim 23, wherein the surface of said opening of said bearing member and said central working surface, have the height of surface roughness being at least several times smaller than said radial gap, and wherein said end working surfaces are strictly parallel to each other and perpendicular to the surface of said opening, said parallelilty and perpendicularity being at least several times lower than said radial gap and said axial play.

25. The method of claim 24, wherein said radial gap is within the range of 1 to 2 microns and said axial play is within the range of 2 to 4 microns.

26. The method of claim 24, wherein said fluid is air.

27. The method of claim 24, wherein said shaft being further provided with auxiliary profiled grooves which communicate with the atmosphere for sucking air into said radial gap to stabilize said radial gap during rotation of said bearing member.

28. The method of claim 24 wherein said fixing means is a polymerizable glue.

29. The method of claim 24 wherein said fixing means is welding.

* * * * *